US011356642B2

(12) United States Patent
Almomani et al.

(10) Patent No.: US 11,356,642 B2
(45) Date of Patent: *Jun. 7, 2022

(54) ELECTRONIC LOCK WITH REMOTE MONITORING

(71) Applicant: Spectrum Brands, Inc., Middleton, WI (US)

(72) Inventors: Nedal Akram Almomani, Mission Viejo, CA (US); Michael Maridakis, Garden Grove, CA (US); Greg Gluchowski, Coto de Caza, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,107

(22) Filed: May 19, 2020

(65) Prior Publication Data
US 2020/0389628 A1  Dec. 10, 2020

Related U.S. Application Data

(63) Continuation of application No. 16/042,161, filed on Jul. 23, 2018, now Pat. No. 10,666,912, which is a continuation of application No. 14/183,668, filed on Feb. 19, 2014, now Pat. No. 10,033,972.

(60) Provisional application No. 61/779,145, filed on Mar. 13, 2013.

(51) Int. Cl.
*H04N 7/18* (2006.01)
*G07C 9/00* (2020.01)

(52) U.S. Cl.
CPC ......... *H04N 7/186* (2013.01); *G07C 9/00182* (2013.01)

(58) Field of Classification Search
CPC .......................... H04N 7/186; G07C 9/00182
See application file for complete search history.

(56) References Cited

U.S. PATENT DOCUMENTS

| 5,907,352 A | 5/1999 | Gilley |
| 6,429,893 B1 | 8/2002 | Kin |
| 6,570,498 B1 | 5/2003 | Frost et al. |

(Continued)

FOREIGN PATENT DOCUMENTS

| EP | 2037682 A2 | 3/2009 |
| GB | 2424786 A | 10/2006 |

(Continued)

OTHER PUBLICATIONS

International Search Report for International Application No. PCT/US2014/017099, dated May 27, 2014.

(Continued)

*Primary Examiner* — Nam D Pham
(74) *Attorney, Agent, or Firm* — Merchant & Gould P.C.

(57) ABSTRACT

An electronic lockset that allows for remote monitoring includes a locking mechanism, a motion sensor, a camera, and a wireless communication module. The locking mechanism is movable between a locked position and an unlocked position. The motion sensor is configured to detect a person in proximity to the electronic lockset. The camera is configured to capture media content of the person detected by the motion sensor. The wireless communication module is configured to wirelessly transmit the captured media content to an electronic device.

13 Claims, 3 Drawing Sheets

(56) References Cited

U.S. PATENT DOCUMENTS

| | | |
|---|---|---|
| 7,183,894 B2 | 2/2007 | Yui et al. |
| 7,702,913 B2 | 4/2010 | Serani et al. |
| 8,035,478 B2 | 10/2011 | Lee |
| 8,264,323 B2 | 9/2012 | Chandler, Jr. |
| 2005/0057649 A1 | 3/2005 | Marks |
| 2005/0149741 A1 | 7/2005 | Humbel |
| 2005/0184865 A1 | 8/2005 | Han |
| 2006/0114099 A1 | 6/2006 | Deng et al. |
| 2007/0103548 A1 | 5/2007 | Carter |
| 2008/0092610 A1 | 4/2008 | Kuo et al. |
| 2009/0211319 A1 | 8/2009 | McCormack |
| 2010/0171589 A1 | 7/2010 | Haberli |
| 2013/0010120 A1 | 1/2013 | Nnoruka |
| 2013/0031611 A1 | 1/2013 | Barreto |
| 2014/0267740 A1* | 9/2014 | Almomani ......... G07C 9/00182 348/156 |

FOREIGN PATENT DOCUMENTS

| | | |
|---|---|---|
| JP | 200834895 A | 2/2008 |
| JP | 2009044524 A | 2/2009 |
| JP | 2009044524 A | 10/2009 |

OTHER PUBLICATIONS

International Preliminary Report on Patentability or International Application No. PCT/US2014/017099, dated Sep. 24, 2015.
Examination Report No. 1 for Australian Application No. 2014249956, dated Dec. 21, 2016, 4 pgs.
Examination Report No. 2 for Australian Application No. 2014249956, dated Dec. 18, 2017, 4 pgs.

* cited by examiner

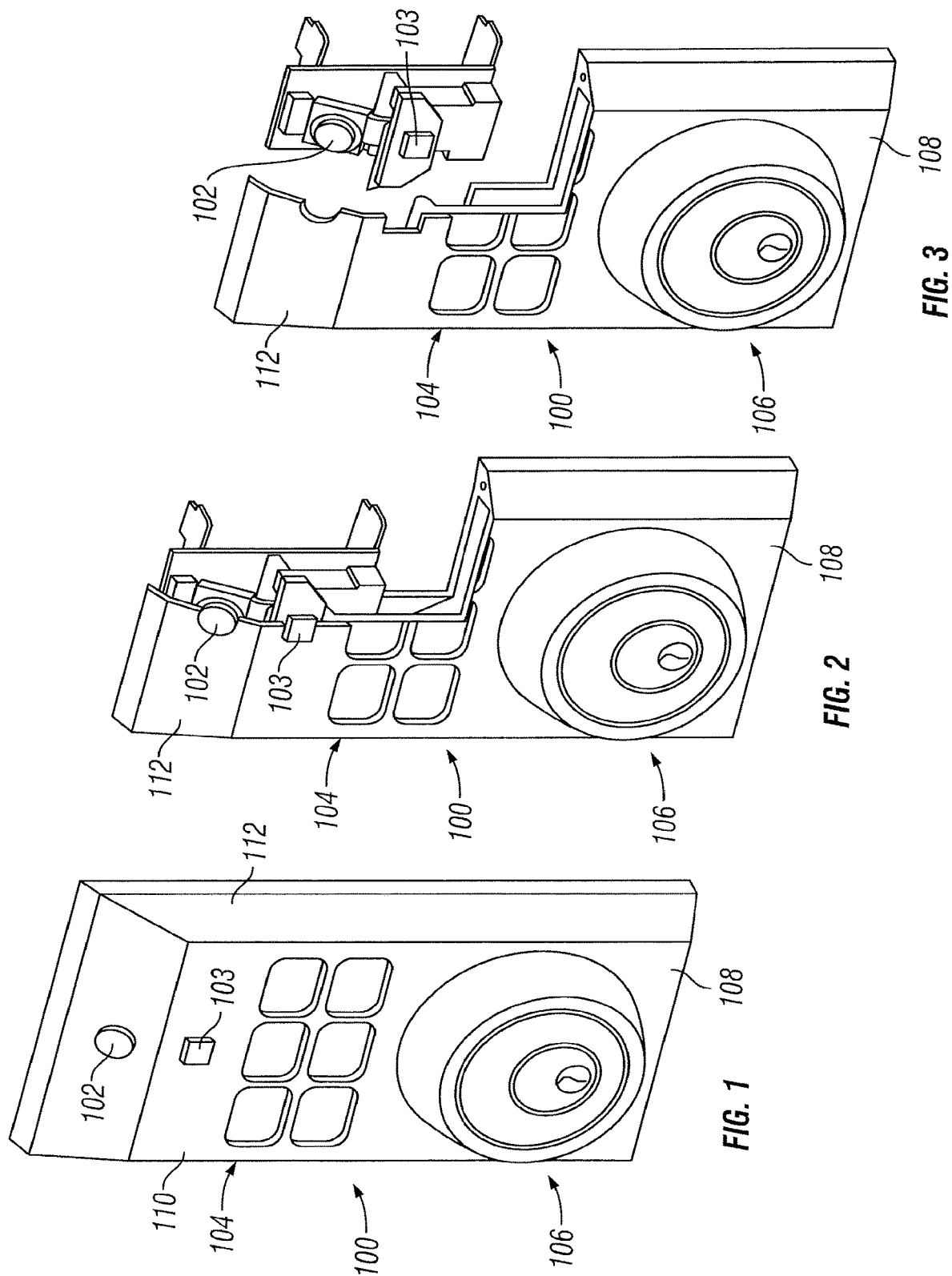

ELECTRONIC LOCK WITH REMOTE MONITORING

RELATED APPLICATIONS

This application is a continuation of U.S. patent application Ser. No. 16/042,161 filed Jul. 23, 2018, now U.S. Pat. No. 10,666,912; which is a continuation of U.S. patent application Ser. No. 14/183,668, filed Feb. 19, 2014, now U.S. Pat. No. 10,033,972; which claims the benefit of U.S. Provisional Application Ser. No. 61/779,145, filed Mar. 13, 2013, which applications are hereby incorporated by reference in their entirety.

TECHNICAL FIELD

This disclosure relates generally to electro-mechanical locks; in particular, this disclosure relates to an electronic lock with an integral camera that allows remote monitoring.

BACKGROUND

Electronic locks have gained increasing acceptance and widespread use in residential and commercial markets. These locksets control ingress through doors in a building by requiring certain electronic credentials. For example, these locksets typically include a control circuit that determines whether to unlock the lockset based on credentials provided by the user, such as using a keypad, etc., without requiring a mechanical key.

In some cases, electronic locks can be configured to communicate wirelessly with other devices, such as part of a security system. For example, it is known to remotely control (i.e., lock/unlock) an electronic lock using a wireless device, such as a mobile phone. However, the capabilities of electronic locks to communicate with other electronic devices are generally limited to status information and control of the lock. Therefore, there is a need for a novel electronic lock that allows remote monitoring not limited to lock status/control information.

SUMMARY

This disclosure relates to an electronic lock with an integral camera that allows remote monitoring. The electronic lock allows the user to remotely see who is at the door via any medium that can present media content (e.g., digital "still image" or "streaming video) such as a smart phone, digital TV, tablet, PC, laptop, or any equivalent medium. This provides convenience when at home and peace of mind when away from home (office or traveling).

When a guest or someone knocks on the door, the owner (if at home) would be able to see who is knocking, such as looking at their mobile device (or using an app that could be made available on their digital TV, tablet, PC, or laptop). If the person happens to be traveling or not at home, he/she could have the remote monitoring feature turned on. In one embodiment, this feature allows a person to receive "still images" via SMS or email or get streaming video through a designated web location. In some embodiments, the lock connects to other devices to share images or video via a home wireless network. The connection through the wireless gateway will enable sharing remotely, such as using the Internet.

According to one aspect, this disclosure provides an electronic lockset that allows for remote monitoring. In one embodiment, the electronic lockset includes a locking mechanism, a motion sensor, a camera, and a wireless communication module. The locking mechanism is movable between a locked position and an unlocked position. The motion sensor is configured to detect a person in proximity to the electronic lockset. The camera is coupled to the motion sensor, and is configured to capture media content of the person detected by the motion sensor. The wireless communication module is configured to wirelessly transmit the captured media content to an electronic device.

In some cases, the wireless communication module may be configured to transmit the media content via a local network. In some embodiments, the wireless communication module is configured to transmit the media content via a public network, such as the Internet. For example, the wireless communication unit may be configured to transmit the media content to a designated website for access by a user. In some cases, the camera may be activated remotely. For example, the camera may be activated independent of detection by the motion sensor.

According to another aspect, the disclosure provides a deadbolt for remote monitoring. The deadbolt includes a bolt movable between an extended position and a retracted position, and a motion sensor configured to detect a person in proximity to the deadbolt. A camera may be coupled to the motion sensor, wherein the camera is configured to capture media content of the person detected by the motion sensor. A wireless communication unit may be configured to wirelessly transmit the captured media content to an electronic device.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIG. 1 is a perspective view of an example electronic lock with an integral camera according to one embodiment of the disclosure;

FIG. 2 is a perspective view of the electronic lock shown in FIG. 1 with a portion removed to show internal components;

FIG. 3 is an exploded view of the electronic lock shown in FIG. 2;

Figure 4:
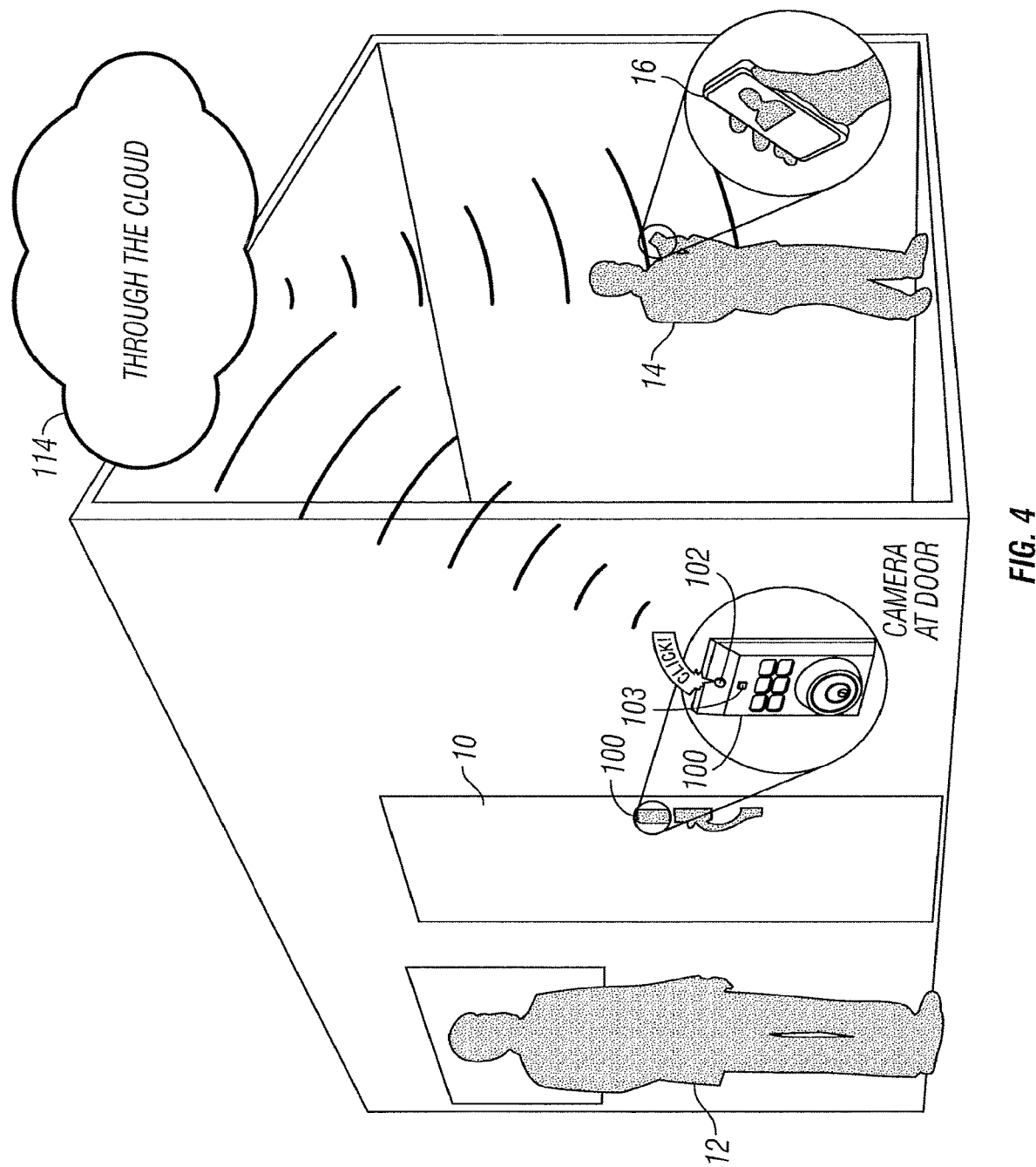
FIG. 4 is diagrammatic representation of a room secured by the electronic lock shown in FIG. 1.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This disclosure generally relates to an electronic lock with an integral camera that can be accessed remotely. The term "electronic lock" is broadly intended to include any type of lockset that uses electrical power in some manner, including but not limited to electronic deadbolts and electronic lever sets. This disclosure encompasses the integration of a digital camera into any type of electronic lock and is not intended to be limited to any particular type of electronic lock.

Referring to FIGS. 1-3, this disclosure provides an electronic lock 100 with an integral camera 102, which is a digital camera configured to take digital photos and/or videos. Preferably, the electronic lock is configured with wireless communication capabilities, such as via a wireless communication unit. The electronic lock 100 includes a controller (not shown) for controlling operation of the camera 102, motion sensor, wireless communication unit, and other electronics of the lock. For example, the electronic lock may be configured to send photos and/or stream video taken by the camera to remote electronic devices, such as sending photos to a user's mobile phone via a text message, email message, or making a video stream accessible via a designated website accessible by the user. The electronic lock 100 could use any wireless protocol, including but not limited to, those compatible with the IEEE 802.11 standard, such as using Wi-Fi, or the IEEE 802.15.4 standard, such as using Zigbee, a cellular network, a wireless local area network, or other network protocol.

In the example shown, the camera 102 is associated with an optional motion sensor 103. For example, the motion sensor 103 could wake up the camera 102 to take a photo or shoot video when someone approaches the electronic lock 100. By way of example, the electronic lock 100 could be configured to send a text message with a photo of someone who has just approached the electronic lock 100. Alternatively, the camera could be selectively activated remotely by a user. For example, the user could access and set configurable options through a designated website or use a dedicated app on a mobile device. Consider an example in which the user is leaving town for a few days for a trip. If the user wanted to remotely monitor the electronic lock 100, the user could log in to a designated website (or use an app) to activate a remote monitoring mode. In this mode, the electronic lock could be configured to continuously stream video, regardless of whether the motion sensor 103 is activated or not. This provides the user with peace of mind to remotely see the area surrounding the electronic lock.

As shown, the electronic lock 100 includes an external cover or rosette 108 with a rectangular shape having a face portion 110 and a bezel edge 112. The rosette 108 is shown merely for purposes of example; the rosette 108 could be any shape or structure and this disclosure is not limited to the particular shape shown in the figures. In the example shown, the camera 102 is integrated into the bezel edge 112, which angles the camera upward to view the face of a person proximate the electronic lock 100. Although the camera has a fixed position in the example shown, the camera 102 may be movable either manually or electronically to change the viewing angle.

In the example shown, the electronic lock includes a keypad 104 for inputting a passcode to lock/unlock the lock 100, but this is shown merely for purposes of example. This disclosure is not dependent on the particular mechanism for locking/unlocking the electronic lock 100 and encompasses all manners by which the electronic lock 100 could be controlled, whether by a keypad, touch screen, biometric sensor(s), wireless communication, or some other way of controlling the electronic lock 100. As shown, the electronic lock 100 includes a mechanical locking assembly 106 that can be locked/unlocked using a typical mechanical key. As with the keypad 104, this is shown merely for purpose of example.

FIG. 4 shows diagrammatically an example use of the electronic lock 100. In this example, the electronic lock 100 is mounted to a door 10, which could be either an exterior or interior door. When a person 12 approaches the electronic lock 100, the motion sensor 103 activates the camera 102 (if not already activated) and takes a photo of the person 12. The electronic lock 100 sends a message via a wireless communication network 114, such as a text message, to the user 14 that someone is at the door 10, with a photo of the person 12 included in the message. The user 14 can view the photo on a remote electronic device 16, such as a mobile phone.

Figure 5:
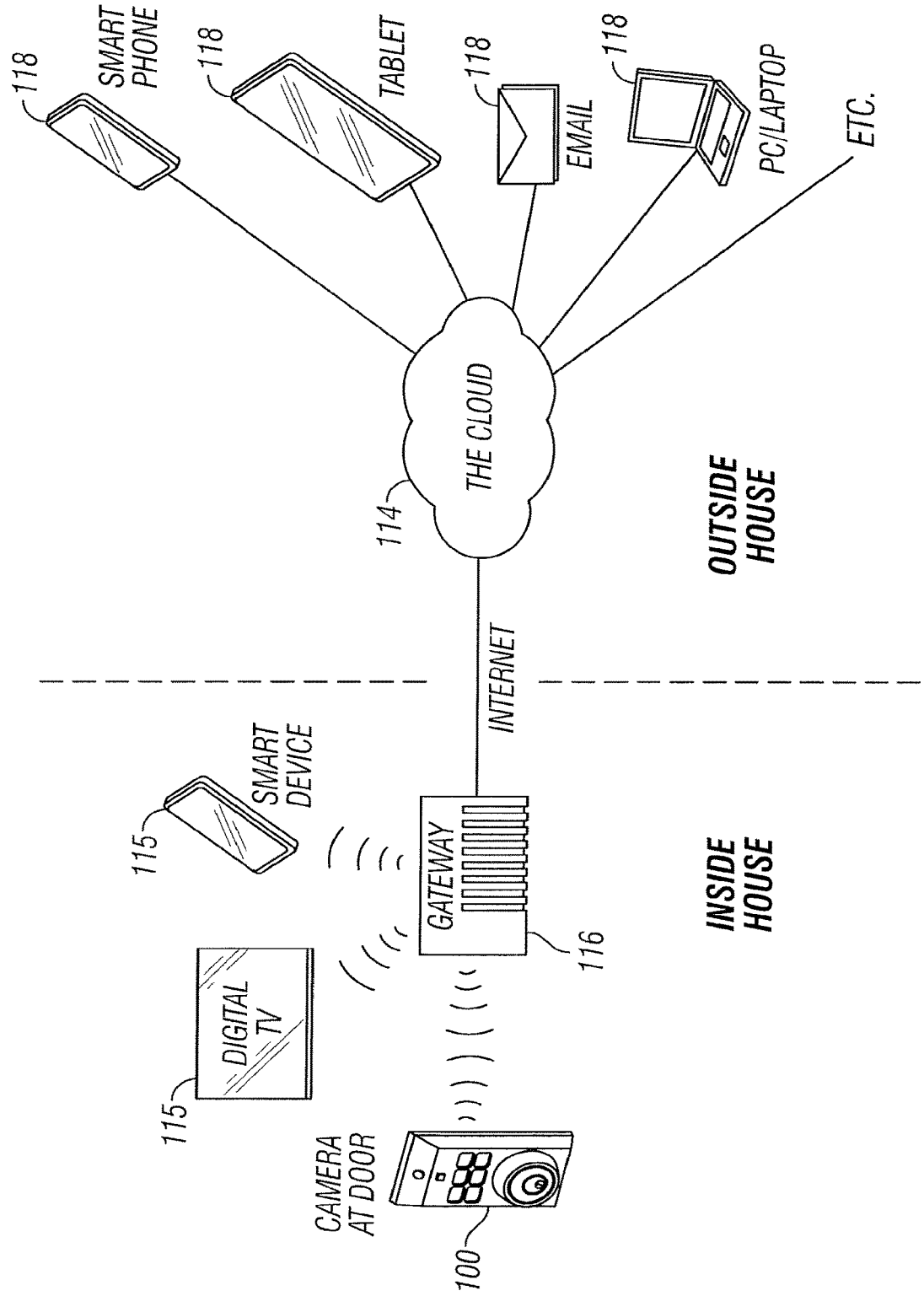
FIG. 5 is a block diagram showing possible components that could be used with the electronic lock.

FIG. 5 is a block diagram showing communication of the electronic lock 100, including photos and/or video from the camera 102, with various electronic devices, including but not limited to, a smart phone, digital TV, tablet, PC, laptop, or any electronic device using any platform, such as Windows™ by Microsoft Corporation of Redmond, Wash., iOS™ from Apple Corporation of Cupertino, Calif., Android™ by Google Corporation of Mountain View, Calif., or any future system or platform. In this example, the electronic lock 100 can communicate with local devices (designated inside) or with geographically remote devices (designated outside house). With respect to local devices 115, these devices may be connected to the electronic lock 100 on a local network using a wireless gateway 116. Consider an example in which the electronic lock 100 is installed on the front door of a home and the user is in the back yard. When someone approaches the front door, the motion sensor 103 activates the camera, which takes a photo of the person at the front door. The electronic lock 100 sends a message with the photo on the local network to the user's mobile device, which notifies the user that someone is at the door with the photo.

Even if the user is geographically remote from the electronic lock 100, a message could be transmitted anywhere in the world using the Internet to remote devices 118. Messages from the electronic lock 100 could be distributed to the user using any communication technique, including but not limited to, text messages, email messages, and/or posting to a designated website that could be accessed by the user. Consider an example in which the electronic lock 100 is installed on the front door of a user's home and he/she is at a location geographically distant from home. The electronic lock 100 could be configured to send a message to the user with a short video clip showing when someone was at the front door.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. An electronic lockset comprising:

an internal assembly and an external assembly, wherein the internal and external assemblies are configured to cooperatively mate with a bolt, each of the internal and external assemblies being adapted to be mounted to a door, the external assembly including:
- an external cover having a bezel, the bezel including an angled portion being angled with respect to a longitudinal axis of the external cover;
- a camera mounted within the external assembly and orientated to capture images through an opening positioned within the angled portion of bezel, the camera facing in a direction to capture content proximate to the external assembly; and
- a keypad for receiving a passcode, wherein the passcode received at the keypad controls the movement of the bolt from an extended position to a retracted position, wherein the external cover at least partially surrounds the keypad;
- a wireless communication unit configured to wirelessly transmit the captured content to an electronic device; and
- a controller in electronic communication with the camera and the wireless communication unit,
- wherein the controller is configured to actuate the camera responsive to a message received by the wireless communication unit from the electronic device, and
- wherein the controller is configured to control movement of the bolt between the extended position and the retracted position responsive to receiving an authorized credential.

2. The electronic lockset of claim 1, wherein the camera is angled upward through the opening in the angled portion of the bezel when mounted.

3. The electronic lockset of claim 1, wherein the electronic device is located remotely from the electronic lockset.

4. The electronic lockset of claim 3, wherein the captured content comprises image content captured by the camera.

5. The electronic lockset of claim 1, further comprising a keyway of a mechanical locking assembly, wherein the mechanical locking assembly controls the movement of the bolt from the extended position to the retracted position when a valid mechanical key is received within the keyway, and wherein the external cover at least partially surrounds the keyway.

6. The electronic lockset of claim 1, further comprising a motion sensor configured to detect a person in proximity to the electronic lockset, wherein the controller is configured to actuate the camera responsive to the motion sensor detecting a person in proximity to the electronic lockset.

7. An electronic lockset comprising:
an internal assembly and an external assembly, wherein the internal and external assemblies are configured to cooperatively mate with a bolt, each of the internal and external assemblies being adapted to be mounted to a door, the external assembly including:
an external cover;
- a camera mounted within the external assembly, the camera being angled upward when mounted to face in a direction to capture content proximate to the external assembly; and
- a keyway of a mechanical locking assembly, wherein the mechanical locking assembly controls the movement of the bolt from an extended position to a retracted position when a valid mechanical key is received within the keyway, and wherein the external cover at least partially surrounds the keyway;
- a wireless communication unit configured to wirelessly transmit information about the captured content to an electronic device; and
- a controller in electronic communication with the camera and the wireless communication unit;
- wherein the controller is configured to actuate the camera responsive to a message received by the wireless communication unit from the electronic device, and
- wherein the controller is configured to control movement of the bolt between the extended position and the retracted position responsive to receiving an authorized credential.

8. The electronic lockset of claim 7, further comprising a keypad for receiving a passcode, wherein the passcode received at the keypad controls the movement of the bolt from the extended position to the retracted position, wherein the external cover at least partially surrounds the keypad.

9. The electronic lockset of claim 8, wherein the external cover at least partially surrounds the keypad and the keyway.

10. The electronic lockset of claim 7, wherein the external cover has a bezel, the bezel including an angled portion being angled with respect to a longitudinal axis of the external cover, wherein the camera is angled upward through an opening in the angled portion of the bezel when mounted.

11. The electronic lockset of claim 7, further comprising a motion sensor configured to detect a person in proximity to the electronic lockset, wherein the controller is configured to actuate the camera responsive to the motion sensor detecting a person in proximity to the electronic lockset.

12. The electronic lockset of claim 7, wherein the electronic device is located remotely from the electronic lockset.

13. The electronic lockset of claim 7, wherein the captured content comprises image content captured by the camera.

* * * * *